United States Patent

Pitches et al.

[15] 3,665,760

[45] May 30, 1972

[54] AIRFLOW DIRECTION INDICATORS

[72] Inventors: Brian Edward Pitches, Balerno; Robert Malcolm Stuart Murray, Edinburgh, both of Scotland

[73] Assignee: Ferranti, Limited, Hollinwood, Lancashire, England

[22] Filed: Dec. 14, 1970

[21] Appl. No.: 97,927

[30] Foreign Application Priority Data

Dec. 15, 1969 Great Britain..................60,918/69

[52] U.S. Cl..................................................73/188, 73/180
[51] Int. Cl.........................................................G01w 1/00
[58] Field of Search....................................73/180, 188, 189

[56] References Cited

UNITED STATES PATENTS 3,105,382   10/1963   Friedman et al..................73/180

*Primary Examiner*—Donald O. Woodiel
*Attorney*—Cameron, Kerkam & Sutton

[57] ABSTRACT

An airflow direction indicator has a hollow shaft mounted for sealed rotation into an enclosure and supporting an inner shaft carrying a vane which is located in the airstream. A seal is provided between the inner shaft and the hollow shaft which allows their relative rotation through a limited angle. A servo system is provided which operates to maintain the hollow shaft and the inner shaft within the limited angle relative to one another, and output means indicate the angular position of the hollow shaft relative to a datum position.

4 Claims, 4 Drawing Figures

Patented May 30, 1972

AIRFLOW DIRECTION INDICATORS

This invention relates to an airflow direction indicator primarily, though not exclusively, for use as an aircraft angle-of-attack sensor.

Airflow direction indicators in general fall into several distinct classes in dependence upon their mode of operation, and one of these classes involves locating a rotatable vane in the airstream and measuring the angular position of the vane relative to a datum. One of the problems with devices of this type has been the necessity to allow freedom of rotation of the vane by the airstream while providing an effective seal against the ingress of moisture or dust into the mechanism. It has been found that effective seals have introduced frictional forces opposing the movement of the vane and hence introducing errors into the output indication given by the indicator.

Also with airflow direction indicators of the type referred to above, difficulty has been experienced by the tendency of the vane to respond in an oscillatory manner to changes of direction of the airstream. Simple damping arrangements, such as viscous damping of the shaft carrying the vane, are not equally effective over the whole range of airspeeds since the aerodynamic forces acting on the vane are proportional to the square of the airspeed. Hence a compromise has to be made in which the vane is underdamped at high airspeeds and overdamped at low airspeeds, with the result that the response of the instrument varies over the range of airspeeds.

It is an object of the invention to provide an airflow direction indicator incorporating a rotatable vane, which may be effectively sealed without introducing serious errors due to friction.

It is a further object of the invention to provide an airflow direction indicator in which movement of the vane is itself undamped but in which oscillations of the vane are damped out and do not appear in the output indication.

According to the present invention there is provided an airflow direction indicator which includes a hollow shaft mounted for sealed rotation into and with respect to a supporting enclosure, an inner shaft passing coaxially through the hollow shaft for rotation relative thereto, a vane arranged for location in the airstream and rigidly attached to the inner shaft, a seal between the inner shaft and the hollow shaft arranged to allow their relative rotation through a limited angle, servo control means operable to rotate the hollow shaft to maintain the relative positions of the inner shaft and the hollow shaft within said limited angle, and output means operable to indicate the angular position of the hollow shaft relative to a datum position.

The invention will now be described with reference to the accompanying drawings, in which.

Figure 1:
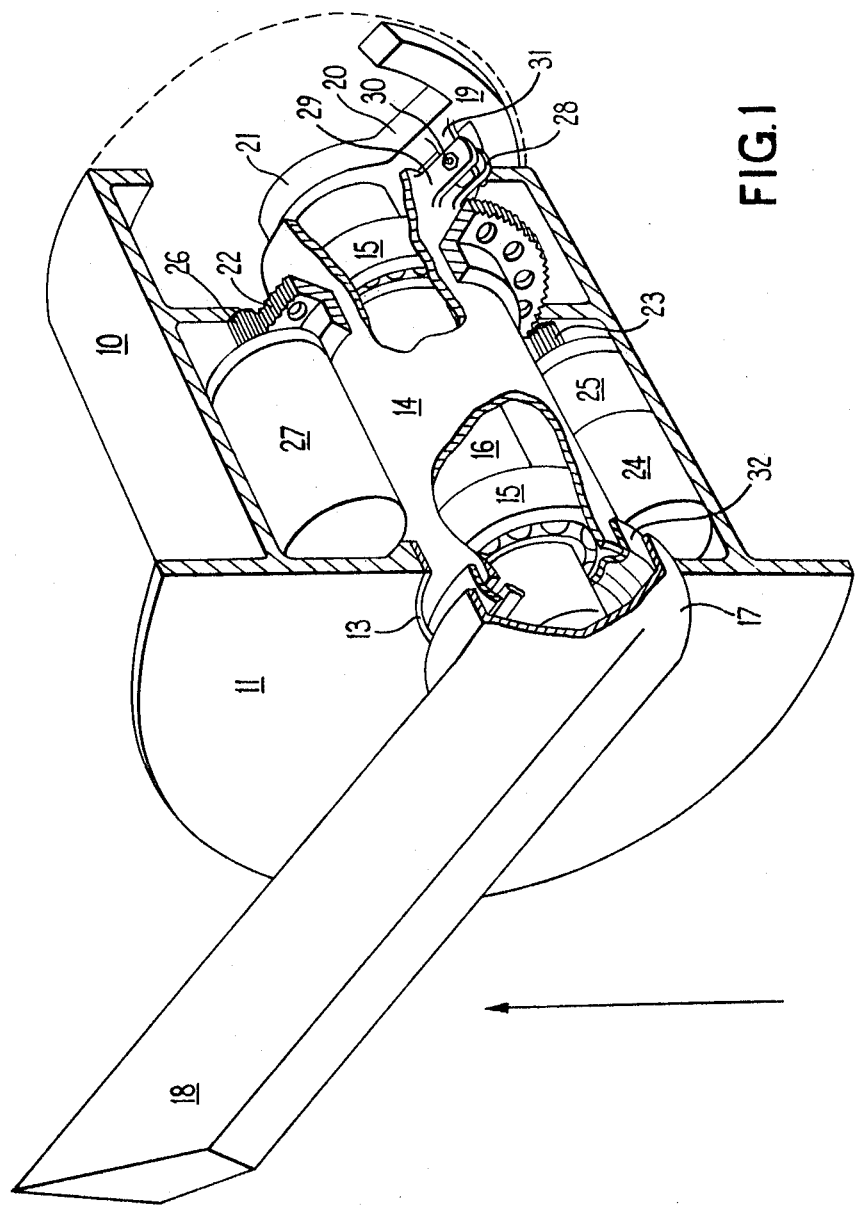
FIG. 1 is a part-sectioned perspective view of an airflow direction indicator according to one embodiment of the invention.
Figure 2:
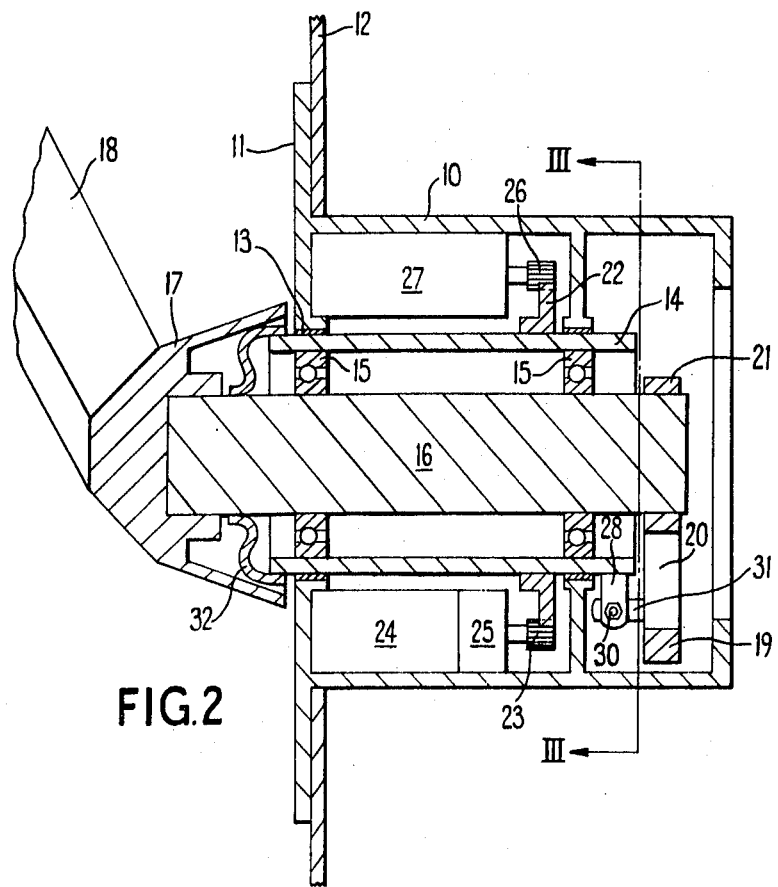
FIG. 2 is a sectional side view of the indicator of FIG. 1.
Figure 3:
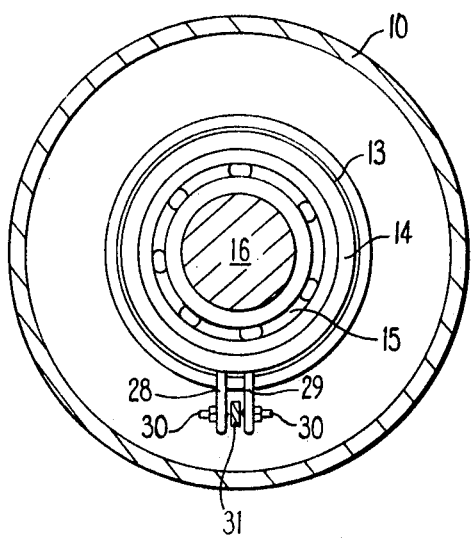
FIG. 3 is a sectional end view of the indicator along the line III—III of FIG. 2.

Referring now to FIGS. 1 to 3, a cylindrical housing 10 is located by means of a flange 11 in an aperture in the fuselage 12 of an aircraft. The housing 10 supports two sleeve bearings 13 in which is carried a hollow shaft 14. The hollow shaft itself carries two ball races 15 in which is carried an inner shaft 16 passing through the hollow shaft 14. The outboard end of the inner shaft 16 has secured to it a cap 17 carrying a vane 18 shown in the form of a double wedge supersonic aerofoil section, swept back at 45° to the axis of rotation. The inboard end of the inner shaft 16 carries a balance weight 19 attached by an arm 20 to a collar 21.

Around the hollow shaft 14 is fastened a gear-ring 22, the teeth of which engage with a pinion 23 on the spindle of an electric motor 24 having a gear-box 25, and another pinion 26 on the spindle of a tacho-generator 27. The motor 24 and the tachogenerator 27 are carried in the housing 10.

The inboard end of the hollow shaft 14 carries a pair of lugs 28 and 29, projecting radially outwards from the shaft and arranged facing but spaced apart from one another. Each lug has an insulated electrical contact 30 projecting through it into the space between the two lugs. The arm 20 securing the balance weight 19 to the inner shaft 16 carries a projecting finger 31 arranged to be located between the contacts 30 on the two lugs 28 and 29. Electrical connections will be taken from the two contacts 30 and from a contact surface on the finger 31, through slip rings or flexible leads (not shown) for connection to the associated equipment.

A dust and moisture-proof seal 32 is secured to the outboard ends of the hollow shaft 14 and the inner shaft 16, allowing only limited relative rotation between them, and is partly covered by the cap 17.

Figure 4:
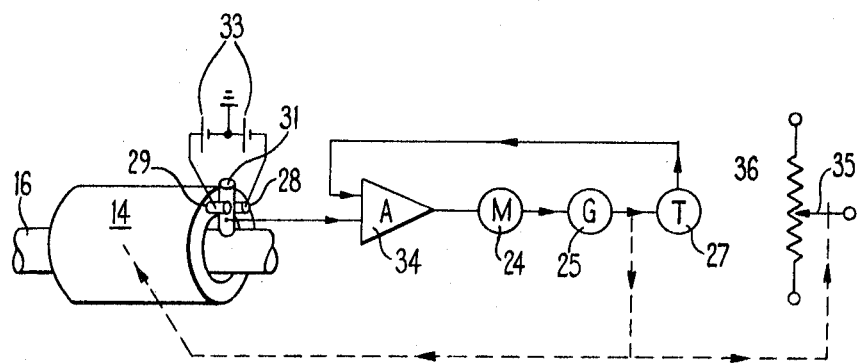
FIG. 4 is a schematic diagram illustrating the operation of the indicator.

FIG. 4 illustrates the servo control means and output means of the airflow direction indicator described above. The indicator itself is shown in schematic form only. The hollow shaft 14 carrying electrical contacts on two lugs 28 and 29 is shown, together with the inner shaft 16 with its contact finger 31. Across the two contacts on the lugs 28 and 29 is connected a battery 33, and the contact surface on the finger 31 is connected to the input of an amplifier 34. The amplifier output controls the motor 24 which is mechanically coupled through the gearbox 25 to the tachogenerator 27 and to the hollow shaft 14. The electrical output of the tachogenerator 27 is fed back to the amplifier 34.

An output representing the angular position of the hollow shaft relative to a datum position may be indicated by the position of a movable contact 35 on a potentiometer 36, the movable contact being mechanically connected to the hollow shaft 14. The mechanical and electrical arrangements shown in FIG. 4 comprise a conventional follow-up servo loop with mechanical feedback.

The lugs 28 and 29 are arranged so that the inner shaft rotation relative to the hollow shaft is very small, say a total of 0.2 degrees of arc.

Since there is very little relative movement between the hollow shaft 14 and the inner shaft 16, the flexible end seal 32 will accommodate this movement while preventing the ingress of moisture or dust into the indicator. The sleeve bearings 13 supporting the hollow outer shaft 14 in the housing 10 perform the same function. Friction in these bearings is overcome by the torque available from the motor 24.

The operation of the airflow direction indicator described above is as follows:

Consider initially that the system has become stable in the airstream, such that the finger 31 on the arm 20 is located mid-way between, and separated from, the two contacts 30 carried on the lugs 28 and 29. The amplifier 34 will be ineffective, and hence the motor 24 will be stationary. The position of the slider 35 on potentiometer 36 indicates the angular position of the vane 18 relative to the datum direction.

If now the direction of the airflow relative to the aircraft changes, then the vane 18 is caused to rotate. Only slight rotation is possible, until the finger 31 comes against the contact 30 on one of the lugs 28 or 29. When, for example, the finger touches contact 30 on lug 29, due to anticlockwise movement of the inner shaft 16 as viewed in FIG. 3, the amplifier 34 causes the motor 24 to be energized and drive the hollow shaft 16. This shaft is driven in an anticlockwise direction, as viewed in FIG. 3, so long as the finger 31 remains touching the contact on lug 29. The tachogenerator 37 feeds back to the amplifier a signal indicating the speed of movement of the hollow shaft 14. The inner shaft 16 is now free to be rotated by the effect of the airstream on the vane 18, and the hollow shaft 14 will continue to rotate until the vane reaches an equilibrium position. When the inner shaft stops rotating, further movement of the hollow shaft breaks the electrical contact between the finger 31 and contact 30 on lug 29. The motor 24 is then no longer energized by the amplifier 34, and movement of the hollow shaft 16 ceases. The slider 35 of potentiometer 36 has been moving with the rotation of the hollow shaft, and its new position now indicates the position of the vane.

In the same way, movement of the vane 18 in the opposite direction causes the motor to be energized so as to rotate the hollow shaft in the same direction as the vane until the finger 31 separates from the contact 30 on lug 28.

Due to the gearing between the hollow shaft 14 and the motor, including that within the gearbox 25, it is not possible for aerodynamic forces applied to the vane to rotate the hollow shaft due to contact between the finger 31 and one of the lugs 28 or 29. Hence the lugs 28 and 29 act as stops to limit the rotation of the inner shaft 16.

In practice the rotation of the hollow shaft will not stop immediately finger 31 and the appropriate contact 30 separate, and the movement may continue until the opposite contact touches the finger. This will cause hunting of the servo system, unless movement of the hollow shaft is damped in some way. A certain amount of damping is provided by the tachogenerator 27. The problem of hunting is due largely to the "on-off" type of pick-off used to indicate relative movement between the hollow shaft 14 and the inner shaft 16. It is therefore advantageous to use some other type of pick-off which will indicate both the direction and the extent of such relative movement. It is possible to use capacitive, inductive or piezo-electric pick-off's for example, in place of the finger 31 and contacts 30.

The output potentiometer 36 may be replaced by some other type of output means. For example a synchro may be used to give a remote indication.

Any suitable type of vane may be used, and the shape and disposition will depend to a large extent to the possible speed of the aircraft.

An airflow direction indicator used in an aircraft may have a limited range of operation, say about 50°. However, the indicator may equally be used in applications where a larger angle of operation, up to 360°, is required. The range will determine whether slip-rings or flexible leads are used for the connections to the contacts 30 and finger 31.

It will be appreciated that, quite distinct from any tendency of the output shaft 14 to oscillate in following the movement of the vane, which tendency may be reduced by normal servo-damping techniques such as velocity feedback from the tachogenerator 27, the vane itself and hence the inner shaft may tend to respond to changes in the direction of the airflow in an oscillatory manner determined by the inertia of the vane and the aerodynamic restoring forces. In the airflow direction detector constructed as described above, the inner shaft 16 and the vane are undamped and free to oscillate, but only through a very small angle limited by the stops provided on the lug 28 and 29. Although the vane may urge the finger 31 quite forcefully into contact with the stops, these forces are reduced at the motor shaft by the action of the gearing as described above. so as not materially to effect the output indication.

If, in addition, the time constant of the servo response is made sufficiently greater than the natural period of oscillation of the vane, these latter relatively high frequency oscillations are not reproduced at the output shaft. There is thus achieved a performance in which the response time is uniform over the entire range of airspeeds, and is determined by the characteristics of the servo system only. The response time may be defined as the time taken for the angular displacement of the output shaft to reach a steady value in its damped oscillatory response to a step change in the airflow direction. In practice, of course, the damping provided by the tachogenerator feedback will be nearly critical damping.

What we claim is:

1. An airflow direction indicator which includes an enclosure, a hollow shaft mounted for sealed rotation into and with respect to the enclosure, an inner shaft passing coaxially through the hollow shaft for rotation relative thereto, a vane arranged for location in the airstream and rigidly attached to the inner shaft, a seal between the inner shaft and the hollow shaft arranged to allow their relative rotation through a limited angle, servo control means operable to rotate the hollow shaft to maintain the relative positions of inner shaft and the hollow shaft within said limited angle, and output means operable to indicate the angular position of the hollow shaft relative to a datum position.

2. An indicator as claimed in claim 1 in which the servo control means comprise sensing means for detecting the direction of rotation of the inner shaft relative to the hollow shaft, and drive means arranged to be so controlled by the sensing means as to cause the appropriate rotation of the hollow shaft.

3. An indicator as claimed in claim 2 in which the sensing means comprises an electric switch having contacts carried by the inner shaft and the hollow shaft and operable to energize the drive means when the relative rotation of the two shafts attains a predetermined value less than said limited angle.

4. An indicator as claimed in claim 3 in which the electric switch contacts carried by the hollow shaft are combined with stop members preventing further relative rotation of the two shafts.

* * * * *